(12) United States Patent
Weber et al.

(10) Patent No.: US 9,069,136 B2
(45) Date of Patent: Jun. 30, 2015

(54) OPTICAL STACK HAVING BIREFRINGENT LAYER OF OPTICALLY SYMMETRICAL CRYSTALLITES

(75) Inventors: Michael F. Weber, Shoreview, MN (US); Yufeng Liu, Woodbury, MN (US); Stephen A. Johnson, Woodbury, MN (US); David T. Yust, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 161 days.

(21) Appl. No.: 13/638,765

(22) PCT Filed: Jun. 13, 2011

(86) PCT No.: PCT/US2011/040177
§ 371 (c)(1),
(2), (4) Date: Oct. 1, 2012

(87) PCT Pub. No.: WO2012/005879
PCT Pub. Date: Jan. 12, 2012

(65) Prior Publication Data
US 2013/0100530 A1     Apr. 25, 2013

Related U.S. Application Data

(60) Provisional application No. 61/360,128, filed on Jun. 30, 2010.

(51) Int. Cl.
*G02B 5/30* (2006.01)

(52) U.S. Cl.
CPC .............. *G02B 5/3083* (2013.01); *G02B 5/305* (2013.01)

(58) Field of Classification Search
CPC .............................. G02B 5/3083; G02B 5/305
USPC .......................... 359/489.11–489.13; 264/1.7
See application file for complete search history.

(56) References Cited

U.S. PATENT DOCUMENTS

| 4,525,413 A | 6/1985 | Rogers |
| 5,795,528 A | 8/1998 | Klein |

(Continued)

FOREIGN PATENT DOCUMENTS

| DE | 100 43 785 | 3/2002 |
| FR | 2908523 | 5/2008 |

(Continued)

OTHER PUBLICATIONS

Huang et al., Using Surface Active Random Copolymers to Control the Domain Orientation in Diblock Copolymer Thin Films, *Macromolecules* 1998, 31, 7461-7450.

(Continued)

*Primary Examiner* — Frank Font
(74) *Attorney, Agent, or Firm* — Carolyn A. Fischer

(57) ABSTRACT

An optical stack (400) having a plurality of alternating polymeric layers (401, 402) is described. The alternating layers may be alternating birefringent (syndiotactic polystyrene, sPS) and isotropic (CoPENa) layers, or alternating positively and negatively birefringent layers. Birefringent layers are made using polymers which form optically symmetrical crystallites upon stretching of the polymer. The optical stack has a large refractive index difference in the x-direction (the stretching direction) and small refractive index differences in the y- and z-directions (the non-stretching directions). The optical stack can be made using standard film tentering methods and may be a multilayer reflective polarizer.

30 Claims, 4 Drawing Sheets

(56) References Cited

U.S. PATENT DOCUMENTS

| | | | |
|---|---|---|---|
| 5,825,543 A | 10/1998 | Ouderkirk | |
| 5,867,316 A | 2/1999 | Carlson | |
| 5,882,774 A | 3/1999 | Jonza | |
| 5,919,536 A | 7/1999 | Bennett | |
| 6,203,921 B1 | 3/2001 | Carter | |
| 6,307,676 B1 | 10/2001 | Merrill | |
| 6,352,761 B1 | 3/2002 | Hebrink | |
| 6,368,699 B1 | 4/2002 | Gilbert | |
| 6,569,515 B2 | 5/2003 | Hebrink | |
| 6,641,900 B2 | 11/2003 | Hebrink | |
| 6,783,349 B2 | 8/2004 | Neavin | |
| 6,808,658 B2 | 10/2004 | Stover | |
| 6,827,886 B2 | 12/2004 | Neavin | |
| 6,830,713 B2 | 12/2004 | Hebrink | |
| 6,888,677 B2* | 5/2005 | Condo et al. | 359/360 |
| 6,927,900 B2 | 8/2005 | Liu | |
| 6,939,499 B2 | 9/2005 | Merrill | |
| 7,052,762 B2 | 5/2006 | Hebrink | |
| 7,077,649 B2* | 7/2006 | Bretscher et al. | 433/30 |
| 7,604,381 B2 | 10/2009 | Hebrink | |
| 2001/0013668 A1* | 8/2001 | Neavin et al. | 264/1.7 |
| 2002/0190406 A1 | 12/2002 | Merrill | |
| 2004/0056994 A1 | 3/2004 | Honda | |
| 2006/0084780 A1 | 4/2006 | Hebrink | |
| 2006/0226561 A1 | 10/2006 | Merrill | |
| 2006/0272766 A1 | 12/2006 | Hebrink | |
| 2007/0177272 A1 | 8/2007 | Benson | |
| 2007/0298271 A1 | 12/2007 | Liu | |
| 2008/0013051 A1 | 1/2008 | Glinski | |
| 2008/0192184 A1* | 8/2008 | Tan et al. | 349/96 |
| 2009/0218707 A1* | 9/2009 | Stover et al. | 264/1.34 |
| 2010/0165660 A1* | 7/2010 | Weber et al. | 362/609 |

FOREIGN PATENT DOCUMENTS

| | | |
|---|---|---|
| WO | WO 90/07553 | 7/1990 |
| WO | WO 90/10027 | 9/1990 |
| WO | WO 94/13480 | 6/1994 |
| WO | WO 95/17303 | 6/1995 |
| WO | WO 95/17691 | 6/1995 |
| WO | WO 95/17692 | 6/1995 |
| WO | WO 95/17699 | 6/1995 |
| WO | WO 96/19347 | 6/1996 |
| WO | WO 97/01440 | 1/1997 |
| WO | WO 99/36248 | 7/1999 |
| WO | WO 99/36262 | 7/1999 |
| WO | WO 2008/144656 | 11/2008 |
| WO | WO 2009/069444 | 6/2009 |
| WO | WO 2012/003123 | 1/2012 |

OTHER PUBLICATIONS

Ma et al., Crystal Structure and Composition of Poly(ethylene terephthalate-co-4, 4'-bibenzoate), *Macromolecules* 2004, 37, 7643-7648.

Ma et al., "Fiber Spinning, Structure, and Properties of Poly(ethylene terephthalate-co-4, 4'-bibenzoate) Copolyesters", *Macromolecules* 2002, 35, 5123-5130.

Carr et al., "Mesophase Structures in Poly(ethylene terephthalate), Poly(ethylene naphthalate) and poly(ethylene naphthalate bibenzoate)", *Polymers for Advanced Technologies*, vol. 8, pp. 592-600.

Polyakova et al., "Oxygen-Barrier Properties of Copolymers Based on Ethylene Terephthalate", Journal of Polymer Science, Part B: Physics, vol. 39, 2001, 1889-1899.

Liu et al., "Oxygen-Barrier Properties of Cold-Drawn Polyesters", *Journal of Polymer Science Part B-Polymer Physics* 2002, vol. 40, 862-877.

Hodge, et al., "Solid-State Structure of Thermally Crystallized Syndiotactic Polystyrene", *Journal of Applied Polymer Science*, vol. 83, 2705-2715 (2002).

Greis et al., "Morphology and Structure of Syndiotactic Polystyrene", Journal of Polymer, vol. 30, 590-594, (1989).

Guerra et al., "Polymorphism in Melt Crystallized Syndiotactic Polystyrene Samples" American Chemical Society, Macromolecules, vol. 23, No. 5, 1990, pp. 1539-1544.

International Search Report PCT/US2011/040177 Oct. 31, 2011, 6 pgs.

M.E. Denker et al. in Society for Information Display 45.1 (2006).

* cited by examiner

OPTICAL STACK HAVING BIREFRINGENT LAYER OF OPTICALLY SYMMETRICAL CRYSTALLITES

CROSS REFERENCE TO RELATED APPLICATION

This application claims the benefit of U.S. Provisional Patent Application No. 61/360,128, filed Jun. 30, 2010, the disclosure of which is incorporated by reference herein in its entirety.

FIELD

An optical stack used to manage light in various types of devices is disclosed. The optical stack may be a multilayer reflective polarizer suitable for use in a display device.

BACKGROUND

Multilayer optical films such as reflective polarizers are designed to reflect light of one polarization orientation and transmit light having an orthogonal polarization orientation. These multilayer reflective polarizers are commonly used in display devices such as computer monitors, laptop computers, televisions, hand-held devices, digital cameras, video devices and the like. A multilayer reflective polarizer can improve performance of a display device by recycling and transmitting light that would otherwise not be utilized by a display panel in the device, thereby improving backlight efficiency and reducing power consumption.

SUMMARY

An optical stack is disclosed herein, comprising: a plurality of alternating birefringent and isotropic layers, the birefringent layers comprising semi-crystalline polymer having optically symmetrical crystallites, wherein: x- and y-directions define a plane parallel to the layers and a z-direction normal to the plane, the x-, y- and z-directions being orthogonal to each other; the birefringent layers have refractive indices $n_{1x}$, $n_{1y}$, and $n_{1z}$ in the x-, y- and z-directions, respectively; and the isotropic layers have refractive indices $n_{2x}$, $n_{2y}$, and $n_{2z}$ in the x-, y- and z-directions, respectively; the optically symmetrical crystallites being substantially aligned such that: the difference between $n_{1x}$ and $n_{1y}$ is greater than about 0.10; and the difference between any two of $n_{1y}$, $n_{1z}$, $n_{2y}$, and $n_{2z}$ is less than about 0.03. The optically symmetrical crystallites may be substantially aligned such that $$|n_{1x}-n_{1y}|>5|n_{1y}-n_{1z}|.$$

In some embodiments, the optical stack comprises: a plurality of alternating birefringent and isotropic layers, the birefringent layers comprising semi-crystalline polymer having optically symmetrical crystallites, wherein: x- and y-directions define a plane parallel to the layers and a z-direction normal to the plane, the x-, y- and z-directions being orthogonal to each other; the birefringent layers have refractive indices $n_{1x}$, $n_{1y}$, and $n_{1z}$ in the x-, y- and z-directions, respectively; and the isotropic layers have refractive indices $n_{2x}$, $n_{2y}$, and $n_{2z}$ in the x-, y- and z-directions, respectively; the optically symmetrical crystallites being substantially aligned such that:

$$|n_{1x}-n_{2x}|>5|n_{1y}-n_{2y}|.$$

In some embodiments, the optical stack comprises: a plurality of alternating birefringent and isotropic layers, the birefringent layers comprising semi-crystalline polymer having optically symmetrical crystallites, wherein: x- and y-directions define a plane parallel to the layers and a z-direction normal to the plane, the x-, y- and z-directions being orthogonal to each other; the birefringent layers have refractive indices $n_{1x}$, $n_{1y}$, and $n_{1z}$ in the x-, y- and z-directions, respectively; and the isotropic layers have refractive indices $n_{2x}$, $n_{2y}$, and $n_{2z}$ in the x-, y- and z-directions, respectively; the optically symmetrical crystallites being substantially aligned such that $$|n_{1x}-n_{2x}|>5|n_{1z}-n_{2z}|.$$

The birefringent layers of the optical stack may exhibit negative or positive birefringence. For example, the birefringent layers may comprise syndiotactic polystyrene and exhibit negative birefringence. For another example, the birefringent layers may comprise nylon and exhibit positive birefringence.

In some embodiments, the optical stack comprises a plurality of alternating first and second birefringent layers, the first birefringent layer exhibiting negative birefringence and the second birefringent layer exhibiting positive birefringence. For this optical stack, wherein: x- and y-directions define a plane parallel to the layers and a z-direction normal to the plane, the x-, y- and z-directions being orthogonal to each other; the birefringent layers have refractive indices $n_{1x}$, $n_{1y}$, and $n_{1z}$ in the x-, y- and z-directions, respectively; and the isotropic layers have refractive indices $n_{2x}$, $n_{2y}$, and $n_{2z}$ in the x-, y- and z-directions, respectively; each first and second birefringent layer may comprise semi-crystalline polymer having optically symmetrical crystallites, the optically symmetrical crystallites being substantially aligned such that the difference between any two of $n_{1y}$, $n_{1z}$, $n_{2y}$, and $n_{2z}$ is less than about 0.03.

A method of making the optical stack is also disclosed herein. The method may comprise: providing a film comprising a plurality of alternating first and second layers, x- and y-directions defining a plane parallel to the layers and a z-direction normal to the plane, the x-, y- and z-directions being orthogonal to each other; conveying the film within a stretcher; and stretching the film in the x-direction within the stretcher, such that the first layer comprises a first birefringent layer comprising semi-crystalline polymer having first optically symmetrical crystallites. The optical stack may be subjected to heat set treatment after stretching.

In some embodiments, the film may be stretched in the x-direction within the stretcher such that the second layer comprises a second isotropic layer. In some embodiments, the film is stretched in the x-direction within the stretcher such that the second layer comprises a second birefringent layer comprising semi-crystalline polymer having second optically symmetrical crystallites, and the first and second birefringent layers exhibit positive and negative birefringence, respectively.

In some embodiments, the optical stack may comprise a reflective polarizer such as those used in optical applications including display devices. In some embodiments, the optical stack may comprise a polarizing beam splitter in which the optical stack is disposed between prisms.

These and other aspects of the invention are described in the detailed description below. In no event should the above summary be construed as a limitation on the claimed subject matter which is defined solely by the claims as set forth herein.

BRIEF DESCRIPTION OF DRAWINGS

The invention may be more completely understood in consideration of the following detailed description in connection with the following figures.

DETAILED DESCRIPTION

The existence of birefringent multilayer reflective polarizers that reflect light of one polarization orientation and transmit light having an orthogonal polarization orientation is well known. Such reflective polarizers, sometimes referred to as optical stacks, are commonly used in display devices to recycle and re-transmit light not normally utilized by the device, thereby improving backlight efficiency and reducing power consumption of the device. Exemplary reflective polarizers are sold by 3M™ Company as Vikuiti™ Dual Brightness Enhancement Films.

In a simplified view, birefringent multilayer reflective polarizers are produced via coextrusion of alternating layers (1,2,1,2,1,2,1 . . . ) of two thermally processible polymers into a film, followed by uniaxial stretching of the film. The polymeric materials are chosen such that one material (1) is positively birefringent (refractive index increases with increasing orientation) and the other material (2) is isotropic or minimally birefringent. The optical thicknesses of the layers in each pair are substantially equal. To obtain reflectivity over a range of wavelengths, the thicknesses of the pairs are varied. The stretching process serves to increase the refractive index of the birefringent material in the stretch direction and decrease the refractive indices in the remaining two directions, whereas the isotropic material largely remains unchanged.

Figure 1:
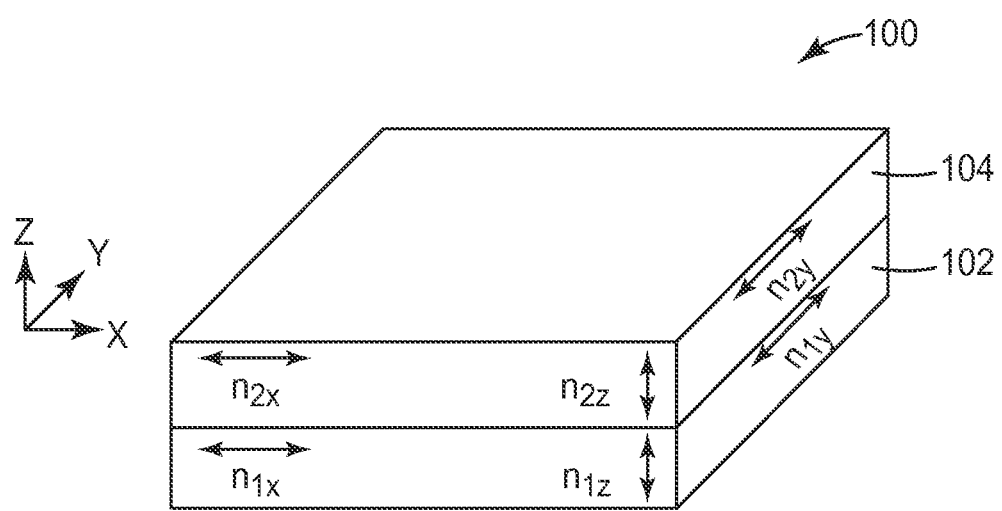
FIG. 1 shows a schematic perspective view of an exemplary pair of layers (1,2) of a reflective polarizer.

FIG. 1 shows a schematic perspective view of an exemplary pair of layers (1,2) of a reflective polarizer. Exemplary pair of layers 100 comprises first and second layers 101 and 102, respectively. The x-, y- and z-axes, which are orthogonal to each other, are defined as shown with the x-axis being the direction in which the film is stretched, the y-axis defining the width of the film, and the z-axis defining the thickness of the film. First layer 101 comprises the birefringent material and has refractive indices $n_{1x}$, $n_{1y}$ and $n_{1z}$ in the x-, y- and z-directions, respectively. Second layer 102 comprises the isotropic material and has refractive indices $n_{2x}$, $n_{2y}$ and $n_{2z}$ in the x-, y- and z-directions, respectively. For an ideal reflective polarizer, the relationships between the refractive indices is such that $n_{1x} \gg n_{2x}$ for high reflectivity of s-polarized light and $n_{1y}=n_{2y}=n_{1z}=n_{2z}=n_{2x}$ for high transmission of p-polarized light and low color.

Ideally, the difference in refractive index between the two layers in the stretch direction, $\Delta n_x$, is maximized since the reflectivity of each pair of layers is strongly related to this index difference. Additionally, the difference in refractive index between the two layers in the y-direction, $\Delta n_y$, is minimized in order to maximize the transmission of the desired polarization state. Lastly, the difference in refractive index between the two layers in the z-direction, $\Delta n_z$, is minimized in order to minimize undesirable reflectivity of p-polarized light in the z-y plane. When used in a liquid crystal display device, any undesirable reflectivity can result in color artifacts in transmitted light.

An overview of stretching methods commonly used to form reflective polarizers can be found in M. E. Denker et al. in *Society For Information Display* 45.1 (2006) and U.S. Pat. No. 6,939,499 B2 (Merrill et al.) and references cited therein. A brief summary is provided here for the convenience of the reader. A conventional method sometimes referred to as "unconstrained uniaxial stretching" utilizes a length orienter that draws the film in the x-direction while allowing the film to deform in the y- and z-directions. Ideally, the film deforms equally in the y- and z-directions such that the refractive indices remain the same or nearly the same for the y- and z-directions. Another method sometimes referred to as "constrained uniaxial stretching" utilizes a conventional tenter oven with divergent rail tenters. Opposite edges of the film are gripped using clips attached to the rails, and the film is stretched in the y-direction as the rails linearly diverge from one another. The film thickness in the z-direction is allowed to change while the length of the film in the x-direction is constrained so that the length remains unchanged.

Yet another method used to stretch multilayer films is sometimes referred to as "parabolic stretching" and approaches ideal uniaxial orientation. Opposite edges of the film are gripped using clips attached to rails, and the film is stretched in the y-direction as the rails travel forward and diverge from one another along parabolic paths. In this method, the film is stretched in the y-direction and at the same time allowed to relax in the x-direction. Substantially the same proportional dimensional changes in the y- and z-directions are obtained. This method is often preferred over conventional methods because a high-performance reflective polarizer can be made having higher polarizing efficiency, i.e., with high reflectivity of s-polarized light and high transmission of p-polarized light with little or no observable color.

Common birefringent polyesters used in birefringent multilayer reflective polarizers include polyethylene naphthalate (PEN) and polyethylene terephthalate (PET). The multilayer optical films are typically stretched using conventional film tenter equipment for constrained uniaxial stretching. Crystallization occurs upon stretching such that the non-symmetric, electron-rich planar groups, e.g., naphthalene and benzene rings, become aligned in the x-y plane of the film, however, the resulting electron density in the y-z plane varies considerably. In general, refractive index in a given direction scales with electron polarizability in that direction. Thus, for multilayer optical films comprising common birefringent polyesters, the refractive index in the x,y-plane is considerably greater than that in the y,z-plane.

As an example, for a multilayer optical film comprising PEN as the birefringent layer, the refractive index in the x-direction is largest at ~1.85, compared to that of the y-direction at ~1.62 and the z-direction at ~1.51. The refractive indices of the PEN layer are different in the y- and z-directions, thus, they cannot be matched using an isotropic layer. For example, an isotropic layer can have a refractive index that matches that of the PEN layer in the y-direction but not the z-direction. This mismatch of refractive indices in the y- and z-directions is ~0.11 and is responsible for off-axis reflectivity and its associated off-axis color problems in a birefringent multilayer reflective polarizer.

The multilayer optical film disclosed herein can be made using various orientation conditions ranging from true uniaxial to constrained uniaxial stretching, and even to asymmetric biaxial stretching. This process freedom is enabled by the use of a special class of polymers which have crystal structures possessing cylindrical or uniaxial symmetry. The polymers in this special class do not have an inherent uniaxial crystalline nature on the molecular level upon synthesis. However, during orientation of a film comprising a layer of one of these polymers, crystallization of the polymer occurs and results in crystallites having uniaxial symmetry. The resulting stretched film has substantially or nearly substantially the same refractive indices in the y- and z-directions. A high-performance multilayer optical film or optical stack can be made using alternating layers of these polymers, the multilayer optical film having high polarizing efficiency with high reflectivity of s-polarized light and high transmission of p-polarized light with little or no observable color.

In some embodiments, the optical stack disclosed herein comprises a plurality of alternating birefringent and isotropic layers. As used herein, a layer is considered birefringent if the refractive index substantially changes when the layer is stretched, e.g., the difference between $n_{1x}$ and $n_{1y}$ is greater than about 0.08, greater than about 0.09 or greater than about 0.10, from about 0.08 to about 1, from about 0.09 to about 1, or from about 0.10 to about 1. A layer is considered isotropic if the refractive index substantially remains the same when the layer is stretched, e.g., the difference in refractive index between $n_{2x}$, $n_{2y}$, and $n_{2z}$ is less than 0.08, less than about 0.05, less than about 0.03, from about 0.08 to about 0.0001, from about 0.05 to about 0.0001, or from about 0.03 to about 0.0001.

The birefringent layers comprise semi-crystalline polymer having optically symmetrical crystallites. The presence of crystallites or a crystalline phase in a birefringent layer may be determined using x-ray scattering techniques, e.g., x-ray crystallography. In this technique, a wave or a series of waves is passed through a sample, and if crystallites are present, the wave is diffracted and an interference pattern is observed. The unit cell structure of the crystallites can be identified because the interference pattern associated with a given unit cell structure is unique to that particular unit cell. Unit cells are described in more detail below.

Crystallites are considered optically symmetrical if they have refractive indices that are substantially the same, i.e., less than about 0.03, less than about 0.01, from about 0.0001 to about 0.03, or from about 0.0001 to about 0.01, in a plane normal to the chain axis.

The birefringent layers comprise optically symmetrical crystallites that are substantially aligned such that the difference between any two of $n_{1y}$, $n_{1z}$, $n_{2y}$, and $n_{2z}$ is less than about 0.03, less than about 0.01, from about 0.0001 to about 0.03, or from about 0.0001 to about 0.01.

The semi-crystalline polymer typically comprises crystalline and amorphous phases. The interference pattern of semi-crystalline polymer predominantly originates from the crystalline phase, as an amorphous phase does not give rise to a distinct interference pattern. Exemplary birefringent layers comprise at least about 10% volume, at least about 20% volume, at least about 30% volume, from about 10 to about 60% volume, from about 20 to about 60% volume, or from about 30 to about 60% volume of optically symmetrical crystallites relative to the total volume of the semi-crystalline polymer.

The birefringent layers comprise optically symmetrical crystallites, and the crystallites may have a heat of fusion greater than about 5 J/g, greater than about 15 J/g, or from about 10 to about 60 J/g. Heat of fusion is usually determined by differential scanning calorimetry at 20° C./min heating rate.

The birefringent layers may exhibit negative birefringence, wherein the refractive index of a birefringent layer decreases in the x-direction upon stretching, and either one or both of the refractive indices in the y- and z-directions increases upon stretching.

An exemplary polymer that exhibits negative birefringence is syndiotactic polystyrene (sPS). Several crystalline forms of sPS are known and are described, for example, in K. Hodge et al. in *Journal of Applied Polymer Science* 83, 2705-2715 (2002) and O. Greis et al. in *Polymer* 30, 590-594 (1989). A film of amorphous sPS can undergo stress-induced crystallization during a typical orientation process. The α-crystalline form of sPS, for example, may result upon orientation; the α-crystalline is described in the aforementioned references and typically has unit cell dimensions of a=b=26.3 Å and c=5.1 Å. The aromatic rings of sPS are thought to arrange in a symmetrical cylindrical geometry with the rings aligned perpendicular to the long (stretch) axis, forming a hexagonal shape when viewed along the long axis. The α-crystalline form of sPS can be characterized by density, having a density of 1.033 g/cm$^3$ as compared to amorphous sPS having 1.046 g/cm$^3$, when measured according to the procedure described in K. Hodge et al.

Exemplary polymers that exhibit negative birefringence are listed in Table 1.

In some embodiments, the optical stack can be made using alternating birefringent and isotropic layers, wherein the birefringent layers exhibit negative birefringence. An exemplary optical stack having such a construction comprises sPS and amorphous polyesters comprising naphthalene dicarboxylate and terephalate as dicarboxylate monomers, referred to herein as CoPEN. A variety of hydroxyl-containing monomers may be used to make CoPEN polymers, including glycols such as ethylene glycol, diols such as 1,6-hexanediol, and multifunctional diols such as trimethylolpropane. CoPEN polymers are described in U.S. Pat. No. 7,604,381 B2 (Hebrink et al.).

The birefringent layers may exhibit positive birefringence, wherein the refractive index of a birefringent layer increases in the x-direction upon stretching, and either one or both of the refractive indices in the y- and z-directions decreases upon stretching.

Exemplary polymers that exhibit positive birefringence are polyamides such as nylon.

Exemplary polymers that exhibit positive birefringence are listed in Table 2.

In some embodiments, the optical stack comprises a plurality of alternating first and second birefringent layers, the first birefringent layer exhibiting negative birefringence and the second birefringent layer exhibiting positive birefringence. In principle, either layer may have a refractive index that is greater in the x-direction after orientation, but in most cases, the layer that exhibits negative birefringence will have a refractive index in the x-direction after orientation that is less than that of the layer that exhibits positive birefringence.

Negatively Birefringent Polymers

The optical uniaxial semicrystalline polymers which exhibit negative birefringence, also referred to as negatively birefringent polymers, may be obtained in any number of ways. One approach is to synthesis a leaf-like molecule that is able to crystallize and form a columnar crystal structure due to its symmetrical unit cell construction that resembles the shape of a disc. The discotic unit cell structure is uniquely available only with certain thermoplastics whose crystal unit cell dimensions follow the relationship:

$$a=b>c \quad (1)$$

where a, b and c are the unit cell dimensions. The chain axis is normal to a,b-plane of the unit cell. The unit cell angles ($\alpha$, $\beta$ and $\gamma$), preferably but not necessarily, may be about 90 degrees.

A unit cell of a crystal is a spatial arrangement of atoms which is tiled in three-dimensional space to describe the crystal. The positions of the atoms inside the unit cell are described by the symmetric unit, the set of atomic positions measured from a lattice point. For each crystal structure, the unit cell is usually chosen to make the resulting lattice as symmetric as possible. There are seven unique crystal systems. The simplest and most symmetric unit cell is the cubic unit cell, which is not useful for negatively birefringent thermoplastic polymers due to its unit cell dimensions which do not follow the relationship outlined in equation (1). The other six systems, in order of decreasing symmetry, are hexagonal, tetragonal, rhombohedral (also known as trigonal), orthorhombic, monoclinic and triclinic. Therefore, hexagonal and tetragonal are most favorable crystalline forms for designing negatively birefringent thermoplastic polymers.

In comparison, most polyesters crystallize into the triclinic crystal structure which has the least symmetry in crystal unit cell geometry as compared to the other six systems described above. In some rare cases, a triclinic unit cell can exhibit positive birefringence. For example, a copolyester comprising terephthalate and biphenyl dicarboxylate can exhibit a positive birefringence substantially similar to a uniaxial crystal unit cell, despite the fact that the copolyester has a unit cell structure that resembles a triclinic structure. A particular example of a copolyester that can exhibit positive birefringence is polyethyleneterephthalate (PET) wherein 35 mol % of terephthalate is replaced with biphenyl dicarboxylate.

Figure 2:
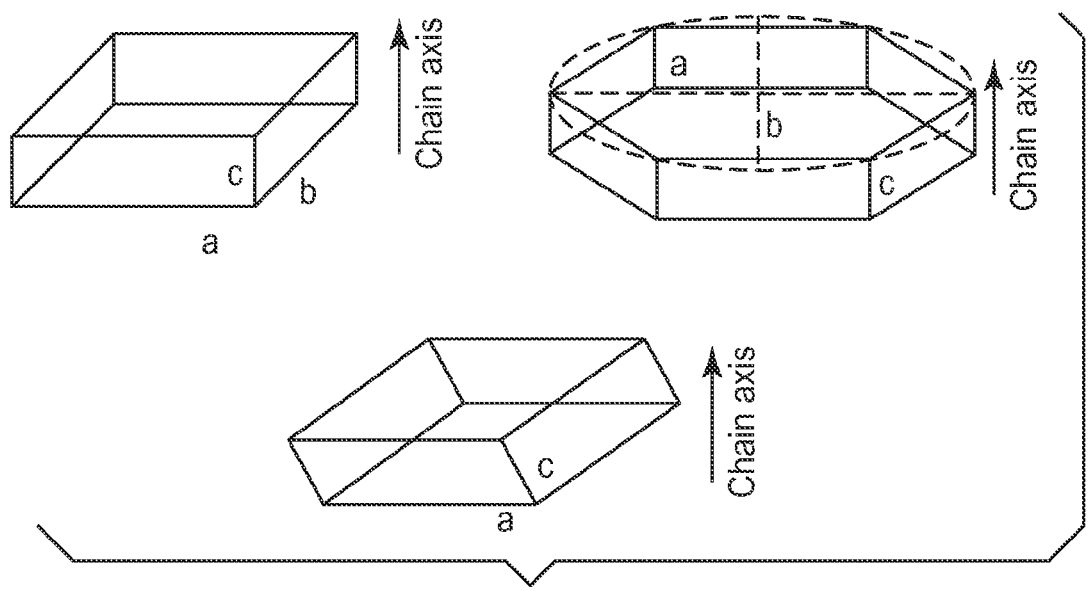
FIG. 2 shows suitable crystallographic forms for polymers that exhibit negative birefringence upon stretching.

FIG. 2 shows suitable crystallographic forms for negatively birefringent polymers, the forms comprising hexagonal, tetragonal, orthorhombic, monoclinic and trigonal unit cells.

The relationship between the negative birefringence and the shape of the unit cell is such that the negative birefringence comes from the aspect ratio L as defined by the following expression:

$$L = \frac{a}{c}, \text{ and } L > 1 \quad (2)$$

where a and c are the unit cell dimensions.

A large aspect ratio L gives rise to a greater potential for a thermoplastic polymer to be negatively birefringent. Also the degree of chain orientation is important and it affects the degree of crystallinity developed during stretching, a key processing step to make a reflective polarizer. It is important to stretch the film close to its glass transition temperature to maximize the chain orientation. However the temperature has to be high enough such that the film does not develop haze by the process of cavitation. The typical stretching temperature is 10 to 30° C. above the glass transition temperature of the birefringent thermoplastic polymer. Films can be heat set to further develop crystallinity.

Table 1 lists thermoplastic polymers that have discotic unit cell structure that gives rise to negative birefringence.

TABLE 1

| Polymer | Crystal System | a | b | c | a/c |
|---|---|---|---|---|---|
| Polystyrene, syndiotactic | Hexagonal | 26.26 | 26.26 | 5.05 | 5.2 |
| Poly(vinylcyclobutane) | Tetragonal | 34.12 | 34.12 | 6.6 | 5.2 |
| Poly(3-methyl-1-butene) | Tetragonal | 34.3 | 34.3 | 6.85 | 5.0 |
| Poly(N,N-dibutyl-acrylamide) | Hexagonal | 26.3 | 26.3 | 6.3 | 4.2 |
| Poly(vinylcycloheptane) | Tetragonal | 23.4 | 23.4 | 6.5 | 3.6 |
| Poly(1-pentene), isotactic | Monoclinic | 22.4 | 21.2 | 6.49 | 3.5 |
| Poly(vinylcyclohexane) | Tetragonal | 21.99 | 21.99 | 6.43 | 3.4 |
| Poly(propylene), isotactic | Hexagonal | 22.03 | 22.03 | 6.49 | 3.4 |
| Poly(fluorostyrene), isotactic | Trigonal | 22.15 | 22.15 | 6.63 | 3.3 |
| Polystyrene, isotactic | Trigonal | 22.08 | 22.08 | 6.626 | 3.3 |
| Poly(vinylethylsilane), isotactic | Hexagonal | 21.60 | 21.60 | 6.50 | 3.3 |
| Poly(4-methyl-1-pentene), isotactic | Hexagonal | 22.17 | 22.17 | 6.69 | 3.3 |
| Poly(vinylcyclopentane) | Tetragonal | 20.14 | 20.14 | 6.50 | 3.1 |
| Poly(3-cyclohexyl-propene) | Trigonal | 19.12 | 19.12 | 6.33 | 3.0 |
| Poly(perhydrotriphenylene ethylene) | Hexagonal | 14.34 | 14.34 | 4.78 | 3.0 |
| Polypropylene, isotactic | Trigonal | 19.08 | 19.08 | 6.49 | 2.9 |
| Poly(4,4-dimethyl-1-pentene) | Tetragonal | 20.35 | 20.35 | 7.01 | 2.9 |
| Poly(p-phenylene) complex w/SbF$_5$ | Hexagonal | 12 | 12 | 4.2 | 2.9 |
| Poly(isobutyl acrylate), isotactic | Orthorhombic | 17.92 | 17.92 | 6.42 | 2.8 |
| Poly(4-methyl-1-pentene), isotactic | Tetragonal | 19.46 | 19.46 | 7.022 | 2.8 |
| Poly(1-butene), isotactic 1.[1] | Trigonal | 17.7 | 17.7 | 6.50 | 2.7 |
| Poly(1-butene), isotactic[2] | Hexagonal | 17.3 | 17.3 | 6.7 | 2.6 |
| Poly(vinyl formate), isotactic | Trigonal | 15.9 | 15.9 | 6.55 | 2.4 |
| Poly(o-methyl styrene), isotactic | Tetragonal | 19.01 | 19.01 | 8.1 | 2.3 |
| Poly(vinylcyclopropane) | Trigonal | 13.6 | 13.6 | 6.48 | 2.1 |
| Poly(3-methyl-1-pentene) | Tetragonal | 13.35 | 13.35 | 6.80 | 2.0 |
| Poly(5-methyl-1-pentene) | Hexagonal | 10.2 | 10.2 | 6.50 | 1.6 |
| Poly(acrylonitrile), isotactic | Tetragonal | 11.4 | 11.4 | 8.2 | 1.4 |

[1]CAS #25036-29-7
[2]CAS #9003-28-5

Positively Birefringent Polymers

In order to obtain uniaxial films with positive birefringent thermoplastic materials, one approach is to synthesis a linear molecule that is able to crystallize such that it forms a symmetrical crystal assembly under external stress (e.g. stretching in a tenter) due to its symmetrical unit cell construction that resembles the shape of a uniaxial symmetrical rod. The cylindrical unit cell structure is uniquely available only with certain thermoplastics whose crystal unit cell dimensions follow the relationship:

$$a=b<c \quad (3)$$

where a, b and c are the unit cell dimensions. Chain axis (c) is normal to a-b plane of the unit cell. The unit angles ($\alpha$, $\beta$ and $\gamma$), preferably but not necessarily, may be about 90 degrees.

A unit cell is a spatial arrangement of atoms which is tiled in three-dimensional space to describe the crystal. The positions of the atoms inside the unit cell are described by the symmetric unit, the set of atomic positions measured from a lattice point. For each crystal structure, the unit cell is usually chosen to make the resulting lattice as symmetric as possible. There are seven unique crystal systems. The simplest and most symmetric unit cell is the cubic unit cell, which is not useful for positively birefringent thermoplastic polymers due to its unit cell dimensions which do not follow the relationship outlined in equation (3). The other six systems, in order of decreasing symmetry, are hexagonal, tetragonal, rhombohedral (also known as trigonal), orthorhombic, monoclinic and triclinic. The unit cell system for uniaxial thermoplastic polymers with positive birefringence is preferably hexagonal, tetragonal, monoclinic, or trigonal. It is more preferably that the unit cell system is hexagonal or tetragonal. Yet it is most preferably that the unit cell system is hexagonal.

Figure 3:
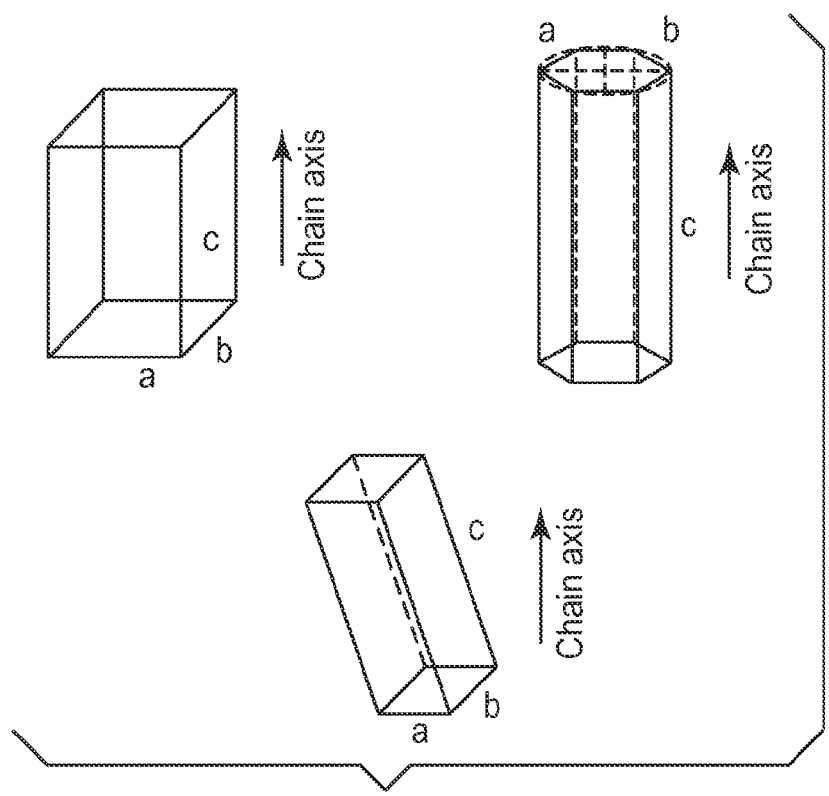
FIG. 3 shows suitable crystallographic forms for polymers that exhibit positive birefringence upon stretching.

FIG. 3 shows suitable crystallographic forms for positively birefringent polymers with uniaxial symmetric crystals.

The relationship between the positive birefringence and the shape of the unit cell is such that the positive birefringence comes from the aspect ratio L as defined by the following expression:

$$L = \frac{c}{a}, \text{ and } L > 1 \qquad (4)$$

where a and c are the unit cell dimensions.

A large aspect ratio L gives rise to a greater potential for a thermoplastic polymer to be positively birefringent. Also the degree of chain orientation is important and it affects the degree of crystallinity developed during stretching, a key processing step to make a reflective polarizer. It is important to stretch the film close to its glass transition temperature to maximize the chain orientation. However the temperature has to be high enough such that the film does not develop haze by the process of cavitation. The typical stretching temperature is 10 to 30° C. above the glass transition temperature of the birefringent thermoplastic polymer. Films can be heat set to further develop crystallinity.

Table 2 lists thermoplastic polymers that have unit cell structure that resembles a uniaxial symmetrical rod. The uniaxial symmetrical rod gives rise to positive birefringence with matched refractive indices in the y- and z-directions. Table 2 includes different types of nylon, and useful positively birefringent nylons also include nylon 6/66, nylon 6/12, nylon 6/10, nylon 6/6 and nylon 4/6.

Useful positively birefringent polymers include polyester comprising diphenyl dicarboxylate monomers, as described in U.S. Provisional application Ser. No. 61/360,307 by Liu et al., filed on this same day.

TABLE 2

| Polymer | Crystal System | a | b | c | c/a |
|---|---|---|---|---|---|
| Poly(L-alanylglycylglycylglycine) | Hexagonal | 4.89 | 4.89 | 36.60 | 7.5 |
| Nylon 3 | Hexagonal | 4.79 | 4.79 | 35.2 | 7.3 |
| Nylon 2/6 | Hexagonal | 4.79 | 4.79 | 35.1 | 7.3 |
| Nylon 7/7 | Rhombohedral | 4.79 | 4.79 | 34.5 | 7.2 |
| Nylon 12 | Hexagonal | 4.80 | 4.80 | 32.1 | 6.7 |
| Poly(L-methionine) alpha helix | Hexagonal | 11.49 | 11.49 | 70.5 | 6.1 |
| Poly(chlorotrifluoroethylene) | Hexagonal | 6.34 | 6.34 | 35 | 5.5 |
| Nylon 6/5 | Rhombohedral | 4.79 | 4.79 | 26.1 | 5.4 |
| Nylon 8 | Hexagonal | 4.79 | 4.79 | 21.7 | 4.5 |
| Poly(methylene malonamide) | Hexagonal | 4.79 | 4.79 | 18.0 | 3.8 |
| Nylon 6 | Hexagonal | 4.79 | 4.79 | 16.7 | 3.5 |
| Poly(tetrafluoroethylene) | Hexagonal | 5.65 | 5.65 | 19.54 | 3.5 |
| Poly(tetrafluoroethylene) | Monoclinic | 5.59 | 9.76 | 16.88 | 3.0 |
| Poly(tetrafluoroethylene) | | 5.54 | 5.54 | 16.0 | 2.9 |
| Poly(L-alanylglycyl-L-proline) | Hexagonal | 11.9 | 11.9 | 28.8 | 2.4 |
| Poly(methyl-L-glutamic acid), alpha helix | Hexagonal | 11.96 | 11.96 | 27.5 | 2.3 |
| Poly(glycyl-L-prolyl-L-proline, dry | Hexagonal | 12.5 | 12.5 | 28.7 | 2.3 |
| Poly(4-methyl-1,3-pentadiene), isotactic | Tetragonal | 17.80 | 17.80 | 36.5 | 2.1 |
| Polyethylene | Tetragonal | 4.26 | 4.26 | 8.52 | 2.0 |
| Poly(hexyl-L-glutamate) | Hexagonal | 15.8 | 15.8 | 27 | 1.7 |

Suitable polymers that may be used for the isotropic layer are as follows. It is desirable for the isotropic layer to remain isotropic upon uniaxial orientation at typical draw temperatures of the birefringent layer. Thus, low index polymers preferably have a glass transition temperature below that of polymers listed in Table 2. Usually that temperature is less than 100° C. In order to remain isotropic, these polymers preferably have sufficient irregularity to prevent them from crystallizing during the orientation process and in the end use application. Even greater polymer backbone irregularity is desirable than what is normally required to prevent polymer crystallization when the end use application is above the glass transition temperature of the polymers. For optical performance of the multilayer film, these polymers preferably have an isotropic refractive index substantially matching that of birefringent layers in the non-stretching direction(s). The typical range of the refractive index for the isotropic layers is in the range of 1.35 to 1.70, more preferably 1.40 to 1.65.

Polymeric materials used for the isotropic layer are generally selected depending on the desired refractive index. Isotropic materials include polymethylmethacrylate; amorphous polyesters comprising naphthalene dicarboxylate and terephthalate as dicarboxylate monomers; amorphous polystyrene; polycarbonate; polylactic acid; polydiorganosiloxane polyoxamide block copolymers as described in US 2007/0177272 A1 (Benson et al.); and fluoropolymers such as polyvinylidene fluoride, fluorinated ethylene propylene, and copolymers of tetrafluoroethylene, hexafluoropropylene and vinylidene fluoride.

The optical stack disclosed herein comprises a plurality of alternating layers, meaning that the stack may comprise at least 10 layers, hundreds, or even thousands of layers. The plurality of layers comprises may comprise anywhere from about 10 to about 10,000 layers, from about 10 to about 5000 layers, from about 10 to about 1000 layers, or from about 10 to about 700 layers. In one embodiment, the multilayer optical film disclosed herein comprises from about 50 to about 700 layers.

The optical stack disclosed herein may be a reflective polarizer that can reflect light of one polarization orientation and transmit light having an orthogonal polarization orientation. Such reflective polarizers are described above. The optical stack may comprise a reflective polarizer often described as a type of multilayer optical film and which is used in a variety of display devices such as computer monitors, laptop computers, televisions, cell phones, personal digital assistants and the like. Reflective polarizers are described in U.S. Pat. Nos. 5,825,543; 5,867,316; 5,882,774; 6,352,761 B1; 6,368,699 B1; 6,927,900 B2; U.S. 2006/0084780 A1; 2001/0013668 A1; U.S. Ser. No. 09/229,724; WO 95/17303; WO 95/17691; WO 95/17692; WO 95/17699; WO 96/19347; WO 97/01440; WO 99/36248; and WO 99/36262.

The optical stack may be used in a polarizing beam splitter comprising the optical stack disposed between a pair of prisms. Polarizing beam splitters are described in US 2008/0013051 A1 (Glinski et al.). Polarizing beam splitters may be used in a variety of display devices, such as mini-projection displays, head-mounted displays, virtual viewers, electronic viewfinders, heads-up displays, optical computing, optical correlation, and other optical viewing systems.

EXAMPLES

Example 1

The birefringence of sPS was studied by extruding sPS pellets into a cast web using a pilot plant extruder at 530° F. The film was subsequently stretched using constrained uniaxial stretching at conditions listed in Table 3. The refractive indices of x-, y- and z-directions were measured using a Metricon Prism Coupler and are also shown in Table 3.

TABLE 3

| Ex. | $n_x$ | $n_y$ | $n_z$ | $n_x - n_y$ | $n_y - n_z$ | Orientation Conditions |
|---|---|---|---|---|---|---|
| 1a | 1.5068 | 1.6214 | 1.6211 | −0.1146 | 0.0003 | 3M Long 1 × 5.0, 150° C., 100%/sec |
| 1b | 1.5060 | 1.6168 | 1.6190 | −0.1108 | −0.0022 | 3M Long 1 × 4.5, 150° C., 100%/sec |
| 1c | 1.5137 | 1.6187 | 1.6214 | −0.1050 | −0.0027 | 3M Long 1 × 5.0, 150° C., 100%/sec |
| 1d | 1.5196 | 1.6169 | 1.6159 | −0.0973 | 0.0010 | KARO IV 1 × 6.0, 130° C., 100%/sec |
| 1e | 1.5221 | 1.6192 | 1.6154 | −0.0971 | 0.0038 | 3M Long 1 × 4.5, 130° C., 100%/sec |
| 1f | 1.5249 | 1.6157 | 1.6161 | −0.0908 | −0.0004 | KARO IV 1 × 6.0, 133° C., 100%/sec |
| 1g | 1.5229 | 1.6122 | 1.6154 | −0.0893 | −0.0032 | KARO IV 1 × 5.5, 140° C., 100%/sec |
| 1h | 1.5330 | 1.6045 | 1.6124 | −0.0715 | −0.0079 | 3M Long 1 × 4.5, 150° C., 100%/sec |
| 1i | 1.5570 | 1.6017 | 1.5963 | −0.0447 | 0.0054 | KARO IV 1 × 5.0, 120° C., 100%/sec |
| 1j | 1.5487 | 1.5921 | 1.6007 | −0.0434 | −0.0086 | KARO IV 1 × 4.0, 116° C., 100%/sec |
| 1k | 1.5586 | 1.5956 | 1.5949 | −0.0370 | 0.0007 | KARO IV 1 × 5.5, 150° C., 100%/sec |
| 1l | 1.5896 | 1.5952 | 1.5977 | −0.0056 | −0.0025 | KARO IV 1 × 5.5, 160° C., 100%/sec |

Table 4 shows birefringence of sPS stretched films that were heat set at different conditions.

TABLE 4

| Ex. | $n_x$ | $n_y$ | $n_z$ | $n_x - n_y$ | $n_y - n_z$ | Orientation Conditions |
|---|---|---|---|---|---|---|
| 1n | 1.5232 | 1.6093 | 1.6145 | −0.086 | 0.0052 | 3M Long 1 × 4.5, 130° C., 50%/sec |
| 1n with heat set | 1.5092 | 1.6194 | 1.6214 | −0.110 | 0.0020 | 1 min at 230° C. |
| 1o | 1.5227 | 1.6138 | 1.6148 | −0.091 | 0.0010 | 3M Long 1 × 4.5, 130° C., 100%/sec |
| 1o with heat set | 1.5077 | 1.6220 | 1.6221 | −0.114 | 0.0001 | 1 min at 230° C. |
| 1p | 1.5311 | 1.6100 | 1.6107 | −0.079 | 0.0007 | 3M Long 1 × 4.5, 130° C., 25%/sec |
| 1p with heat set | 1.5099 | 1.6192 | 1.6221 | −0.109 | 0.0029 | 1 min at 230° C. |
| 1q | 1.5207 | 1.6155 | 1.6114 | −0.095 | 0.0041 | 3M Long 1 × 4.5, 135° C., 100%/sec |
| 1q with heat set | 1.5066 | 1.6211 | 1.6239 | −0.115 | 0.0028 | 1 min at 230° C. |

As shown in Tables 3 and 4, sPS films exhibit negative birefringence upon orientation-induced crystallization. The in-plane birefringence ($n_x - n_y$) is about 0.11 and out-of-plane birefringence in the non-stretching direction ($n_y - n_z$) is less than 0.01. According to this, an isotropic material such as CoPEN of 1.62 refractive index could be used to combine with sPS to produce an optical stack of this invention as described in Example 2.

Example 2

Figure 4:
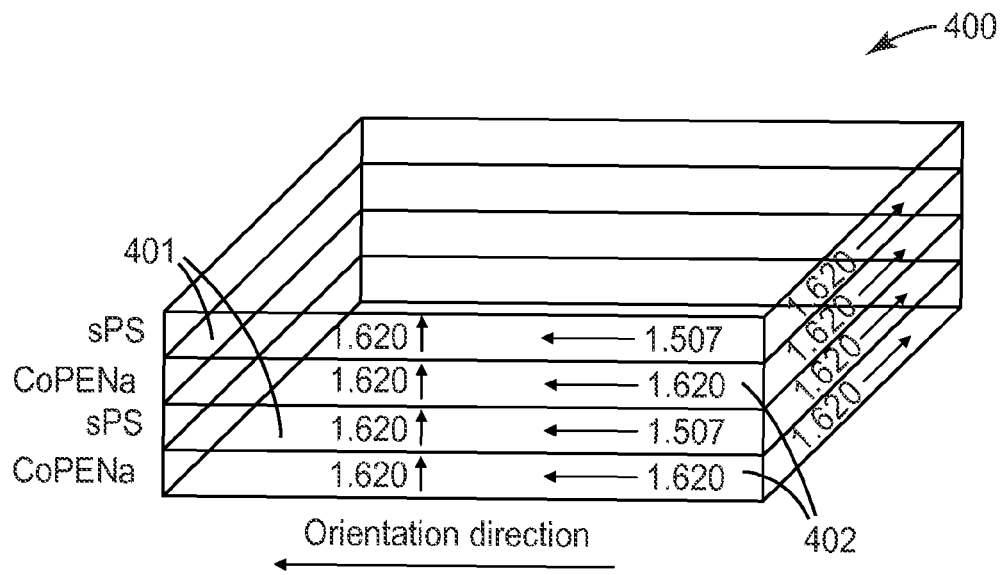
FIG. 4 shows a schematic perspective view of an exemplary optical stack (described in Example 2) comprising alternating layers of syndiotactic polystyrene and an isotropic amorphous polyester.

FIG. 4 shows a schematic perspective view of an exemplary optical stack that may be made according to the method disclosed herein. Optical stack 400 comprises alternating layers 401 and 402, comprising sPS, a negatively birefringent polymer with cylindrically symmetric unit cell structure, and CoPENa, an isotropic amorphous CoPEN having a refractive index of 1.62, respectively. CoPENa comprises a copolyester having 55 mol % naphthalene dicarboxylate and 45 mol % dimethyl terephthalate as dicarboxylate comonomers; and 95.8 mol % ethylene glycol, 4 mol % 1,6 hexanediol, 0.2 mol % trimethylol propane as hydroxyl comonomers, prepared as described in U.S. Pat. No. 7,604,381 B2 (Hebrink et al.). As shown in FIG. 4, the alternating layers have an index mismatch in the stretch direction (x-direction) and substantially the same refractive indices in the non-stretch directions (y- and z-directions). Specifically, between layer 401 and layer 402 the index mismatch in the stretching direction ($n_x$) is about −0.11 and the index mismatch in both non-stretching directions (in-plane and out-of-plane) are less than 0.01. The small index mismatch in non-stretching direction comes from a nearly symmetrically crystal arrangement in sPS layers upon constrained uniaxial stretching.

Example 3

Figure 5:
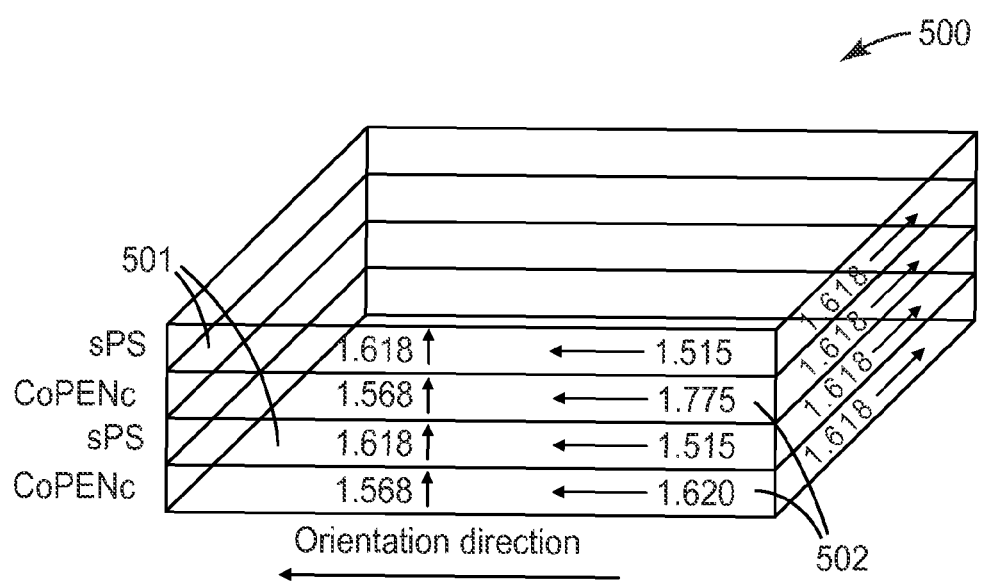
FIG. 5 shows a schematic perspective view of an exemplary optical stack (described in Example 3) comprising alternating layers of syndiotactic polystyrene and an ionomeric polyester which is positively birefringent.

FIG. 5 shows a schematic perspective view of an exemplary optical stack that may be made according to the method disclosed herein. Optical stack 500 comprises alternating layers 501 and 502, comprising sPS, a negatively birefringent polymer with cylindrically symmetric unit cell structure, and CoPENc, a positively birefringent polymer, respectively. The positively birefringent polymer comprises an ionomeric copolyester of naphthalene dicarboxylate and dimethyl terephthalate as dicarboxylate comonomers wherein at least some of the aromatic groups of the monomers have pendant ionic groups; for example, from about 0.25 to about 10 mol % of the aromatic groups have pendant sulfonate groups. Ethylene glycol, 1,6 hexanediol, trimethylol propane are hydroxyl comonomers. These ionomeric copolyesters are described in U.S. application Ser. No. 11/763,622 (Liu et al.). As shown in FIG. 5, the alternating layers have an index mismatch in the x- and z-directions, but the refractive indices in the y-direction are substantially the same. Specifically, between layer 501 and layer 502 the index mismatch in stretching direction ($n_x$) is about 0.26 and the index mismatch in both non-stretching directions (in-plane and out-of-plane) are less than 0.05. The small index mismatch in non-stretching direction comes from a nearly symmetrically crystal arrangement in sPS layers upon constrained uniaxial stretching.

Example 4

Figure 6:
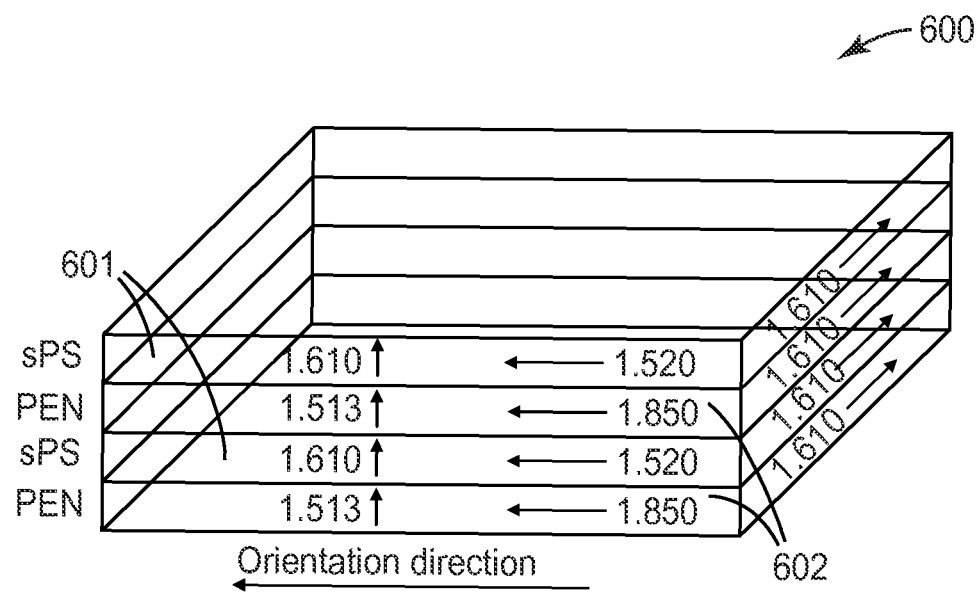
FIG. 6 shows a schematic perspective view of an exemplary optical stack (described in Example 4) comprising alternating layers of syndiotactic polystyrene and polyethylene naphthalate which is positively birefringent.

FIG. 6 shows a schematic perspective view of an exemplary optical stack that may be made according to the method disclosed herein. Optical stack 600 comprises alternating layers 601 and 602, comprising sPS, a negatively birefringent polymer with cylindrically symmetric unit cell structure, and PEN, a highly positively birefringent polymer, respectively. As shown in FIG. 6, the alternating layers have an index mismatch in the x- and z-directions, but the refractive indices in the y-direction are substantially the same.

Example 5

Figure 7:
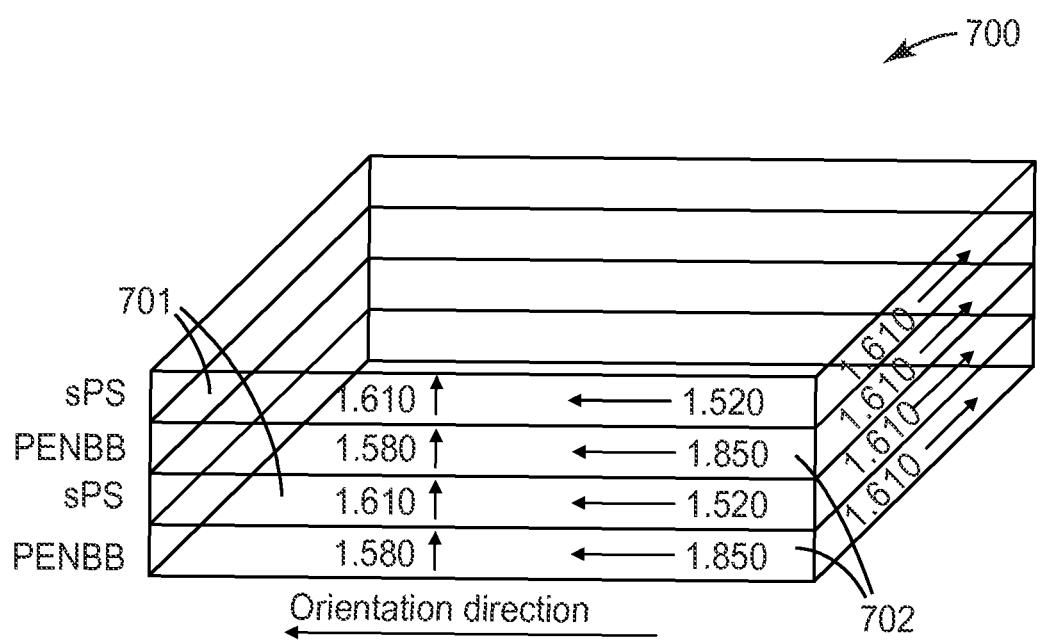
FIG. 7 shows a schematic perspective view of an exemplary optical stack (described in Example 5) comprising alternating layers of syndiotactic polystyrene and a polyester comprising biphenyl dicarboxylate and which is positively birefringent.

FIG. 7 shows a schematic perspective view of an exemplary optical stack that may be made according to the method disclosed herein. Optical stack 700 comprises alternating layers 701 and 702, comprising sPS, a negatively birefringent polymer with cylindrically symmetric unit cell structure, and PENBB, a highly positively birefringent polymer, respectively. PENBB20, for example, is the designation for a copolyester nominally having 80 to 99 mol % 2,6-naphthalate moieties and 1 to 20 mol % 4,4'-bibenzoate moieties, on an acids basis, and 100 mol % ethylene glycol moieties on a diols basis.

As shown in FIG. 7, the alternating layers have an index mismatch in the x- and z-directions, but the refractive indices in the y-direction are substantially the same. Specifically, between layer 701 and layer 702 the index mismatch in stretching direction ($n_x$) is about 0.33 and the index mismatch in both non-stretching directions (in-plane and out-of-plane) are less than 0.03. The small index mismatch in non-stretching direction comes from a nearly symmetrically crystal arrangement in both sPS and PENBB layers upon constrained uniaxial stretching.

What is claimed is:

1. An optical stack comprising:
   a plurality of alternating birefringent and isotropic layers, the birefringent layers comprising semi-crystalline polymer having optically symmetrical crystallites, wherein:
      x- and y-directions define a plane parallel to the layers and a z-direction normal to the plane, the x-, y- and z-directions being orthogonal to each other;
      the birefringent layers have refractive indices $n_{1x}$, $n_{1y}$ and $n_{1z}$ in the x-, y- and z-directions, respectively; and
      the isotropic layers have refractive indices $n_{2x}$, $n_{2y}$ and $n_{2z}$ in the x-, y- and z-directions, respectively;
   the optically symmetrical crystallites being substantially aligned such that:
      the difference between $n_{1x}$ and $n_{1y}$ is greater than about 0.10; and
      the difference between any two of $n_{1y}$, $n_{1z}$, $n_{2y}$, and $n_{2z}$ is less than about 0.03.

2. The optical stack of claim 1, wherein the difference between any two of $n_{1y}$, $n_{1z}$, $n_{2y}$, and $n_{2z}$ is less than about 0.01.

3. The optical stack of claim 1, wherein the birefringent layers exhibit negative birefringence.

4. The optical stack of claim 1, wherein:
   the birefringent layers exhibit negative birefringence; and
   each optically symmetrical crystallite comprises a unit cell of a, b and c cell lengths, wherein a and b are about the same, and c is less than a and b.

5. The optical stack of claim 1, wherein:
   the birefringent layers exhibit negative birefringence; and
   each optically symmetrical crystallite comprises a unit cell of a, b and c cell lengths, wherein a and b are about the same, and a/c is greater than about 2.

6. The optical stack of claim 1, wherein the birefringent layers exhibit positive birefringence.

7. The optical stack of claim 1, wherein:
   the birefringent layers exhibit positive birefringence; and
   each optically symmetrical crystallite comprises a unit cell of a, b and c cell lengths, wherein a and b are about the same, and c is greater than a and b.

8. The optical stack of claim 1, wherein:
   the birefringent layers exhibit positive birefringence; and
   each optically symmetrical crystallite comprises a unit cell of a, b and c cell lengths, wherein a and b are about the same, and c/a is greater than about 2.

9. The optical stack of claim 1, the optically symmetrical crystallites being substantially aligned such that $|n_{1x}-n_{1y}|>5|n_{1y}-n_{1z}|$.

10. The optical stack of claim 1, the optically symmetrical crystallites being substantially aligned such that $|n_{1x}-n_{1y}|>10|n_{1y}-n_{1z}|$.

11. The optical stack of claim 1, wherein each birefringent layer comprises at least 10% by volume of optically symmetrical crystallites.

12. The optical stack of claim 1, wherein the optically symmetrical crystallites have a heat of fusion of at least about 10 J/g as measured by differential scanning calorimetry.

13. The optical stack of claim 1, wherein the optically symmetrical crystallites have a cylindrical shape.

14. The optical stack of claim 1, wherein the optically symmetrical crystallites have a disc shape.

15. The optical stack of claim 1, wherein the birefringent layers exhibit negative birefringence and comprise syndiotactic polystyrene, and the isotropic layers comprise polyester.

16. The optical stack of claim 1, wherein the birefringent layers exhibit positive birefringence and comprise nylon.

17. The optical stack of claim 1, wherein the birefringent layers comprise a polyester, the polyester comprising biphenyl-4,4'-dicarboxylic acid.

18. The optical stack of claim 1, wherein the optical stack comprises a reflective polarizer.

19. A polarizing beams splitter comprising the optical stack of claim 1, disposed between a pair of prisms.

20. An optical stack comprising:
   a plurality of alternating birefringent and isotropic layers, the birefringent layers comprising semi-crystalline polymer having optically symmetrical crystallites, wherein:

x- and y-directions define a plane parallel to the layers and a z-direction normal to the plane, the x-, y- and z-directions being orthogonal to each other;

the birefringent layers have refractive indices $n_{1x}$, $n_{1y}$ and $n_{1z}$ in the x-, y- and z-directions, respectively; and the isotropic layers have refractive indices $n_{2x}$, $n_{2y}$ and $n_{2z}$ in the x-, y- and z-directions, respectively;

the optically symmetrical crystallites being substantially aligned such that:

$$|n_{1x}-n_{2x}|>5|n_{1y}-n_{2y}|.$$

21. The optical stack of claim 20, the optically symmetrical crystallites being substantially aligned such that $$|n_{1x}-n_{2x}|>10|n_{1y}-n_{2y}|.$$

22. An optical stack comprising:
a plurality of alternating birefringent and isotropic layers, the birefringent layers comprising semi-crystalline polymer having optically symmetrical crystallites, wherein:
x- and y-directions define a plane parallel to the layers and a z-direction normal to the plane, the x-, y- and z-directions being orthogonal to each other;
the birefringent layers have refractive indices $n_{1x}$, $n_{1y}$ and $n_{1z}$ in the x-, y- and z-directions, respectively; and
the isotropic layers have refractive indices $n_{2x}$, $n_{2y}$ and $n_{2z}$ in the x-, y- and z-directions, respectively;
the optically symmetrical crystallites being substantially aligned such that $$|n_{1x}-n_{2x}|>5|n_{1z}-n_{2z}|.$$

23. The optical stack of claim 22, the optically symmetrical crystallites being substantially aligned such that $$|n_{1x}-n_{2x}|>10|n_{1z}-n_{2z}|.$$

24. An optical stack comprising
a plurality of alternating first and second birefringent layers, the first birefringent layer exhibiting negative birefringence and the second birefringent layer exhibiting positive birefringence.

25. The optical stack of claim 24, wherein:
x- and y-directions define a plane parallel to the layers and a z-direction normal to the plane, the x-, y- and z-directions being orthogonal to each other;
the first birefringent layers have refractive indices $n_{1x}$, $n_{1y}$ and $n_{1z}$ in the x-, y- and z-directions, respectively; and
the second birefringent layers have refractive indices $n_{2x}$, $n_{2y}$ and $n_{2z}$ in the x-, y- and z-directions, respectively;
each first and second birefringent layer comprises semi-crystalline polymer having optically symmetrical crystallites, the optically symmetrical crystallites being substantially aligned such that the difference between any two of $n_{1y}$, $n_{1z}$, $n_{2y}$, and $n_{2z}$ is less than about 0.03.

26. The optical stack of claim 24, wherein
the optically symmetrical crystallites have a heat of fusion of at least about 10 J/g as measured by differential scanning calorimetry.

27. A method of making an optical stack, comprising:
providing a film comprising a plurality of alternating first and second layers, x- and y-directions defining a plane parallel to the layers and a z-direction normal to the plane, the x-, y- and z-directions being orthogonal to each other;
conveying the film within a stretcher; and
stretching the film in the x-direction within the stretcher, such that the first layer comprises a first birefringent layer comprising semi-crystalline polymer having first optically symmetrical crystallites.

28. The method of claim 27, the method further comprising subjecting the optical stack to heat set treatment after stretching.

29. The method of claim 27, wherein
the film is stretched in the x-direction within the stretcher such that the second layer comprises a second isotropic layer.

30. The method of claim 27, wherein
the film is stretched in the x-direction within the stretcher such that the second layer comprises a second birefringent layer comprising semi-crystalline polymer having second optically symmetrical crystallites, and
the first and second birefringent layers exhibit positive and negative birefringence, respectively.

* * * * *